United States Patent [19]

Kutrieb

[11] Patent Number: 4,507,174
[45] Date of Patent: Mar. 26, 1985

[54] TIRE PYROLIZING

[76] Inventor: Wolfgang A. Kutrieb, P.O. Box 43, Rte. 2, Chetek, Wis. 54728

[21] Appl. No.: 493,258

[22] Filed: May 10, 1983

[51] Int. Cl.³ .............................................. C10B 7/14
[52] U.S. Cl. ....................................... 202/97; 201/25; 202/117; 202/133; 202/266; 202/209; 585/241
[58] Field of Search ................... 201/2.5, 25; 202/97, 202/98, 117, 133, 266, 209; 585/241

[56] References Cited

U.S. PATENT DOCUMENTS

| | | | |
|---|---|---|---|
| 1,184,925 | 5/1916 | Chase | 202/209 |
| 1,200,634 | 10/1916 | MacRae et al. | 202/209 |
| 1,268,742 | 6/1918 | MacRae | 202/209 |
| 4,401,513 | 8/1983 | Brewer | 202/97 |
| 4,402,791 | 9/1983 | Brewer | 202/97 |

Primary Examiner—Jay H. Woo
Assistant Examiner—Mike McGurk
Attorney, Agent, or Firm—Clayton R. Johnson

[57] ABSTRACT

Pyrolytic apparatus for recycling discarded rubber tires and the like that includes an auto clave shell that is closed at both ends to provide a closed vessel and has an interior refractory lining enclosing a reactor chamber and in conjunction with the vessel forms a gas-oil separation chamber surrounding the lining, heat exchangers within the lining, burners exterior of the vessel for conducting heat to the heat exchangers, a compressor for withdrawing pyrolytic gas given off by the pyrolytic decomposition of tires in the reactor chamber and conducting it to a recovered gas storage tank and a line for conducting oil given off by the decomposition of tires in the reactor chamber to an oil storage tank. The vessel walls are of a sufficiently lower temperature than that in the reactor chamber that the oil condenses on the vessel walls. The vaporized oil and recovered gas passes through cracks between the refractory lining blocks to move from the reactor chamber to the gas-oil separation chamber, a pop-off safety valve on the vessel and opening to the last mentioned chamber being provided to prevent the pressure in the vessel increasing above a preselected level. Non-fluid by products such as carbon black, steel and fiberous materials are recovered from the reaction chamber after the tires are decomposed.

17 Claims, 10 Drawing Figures

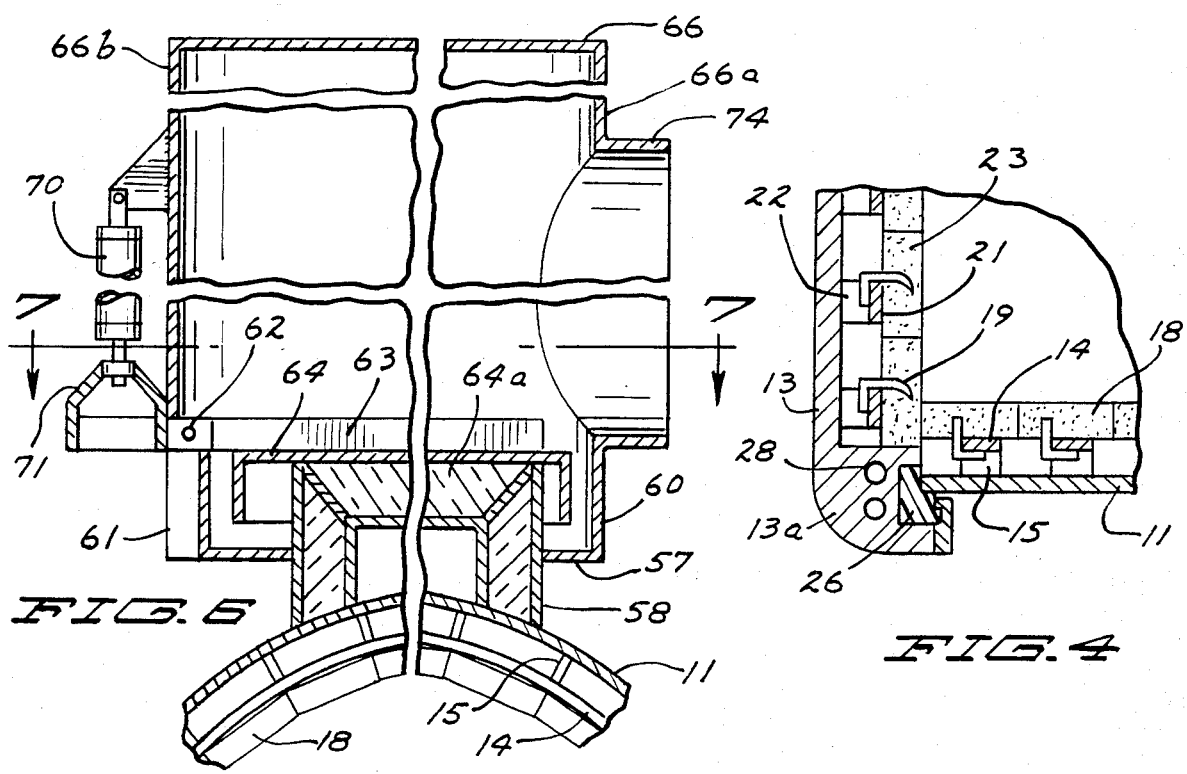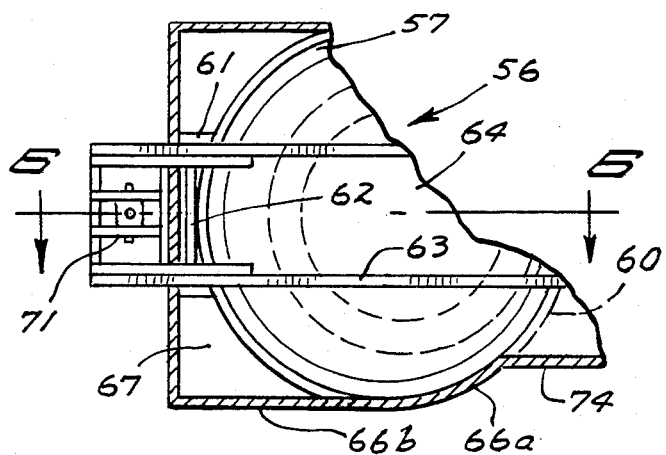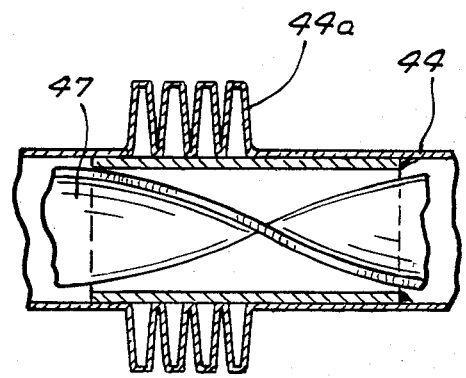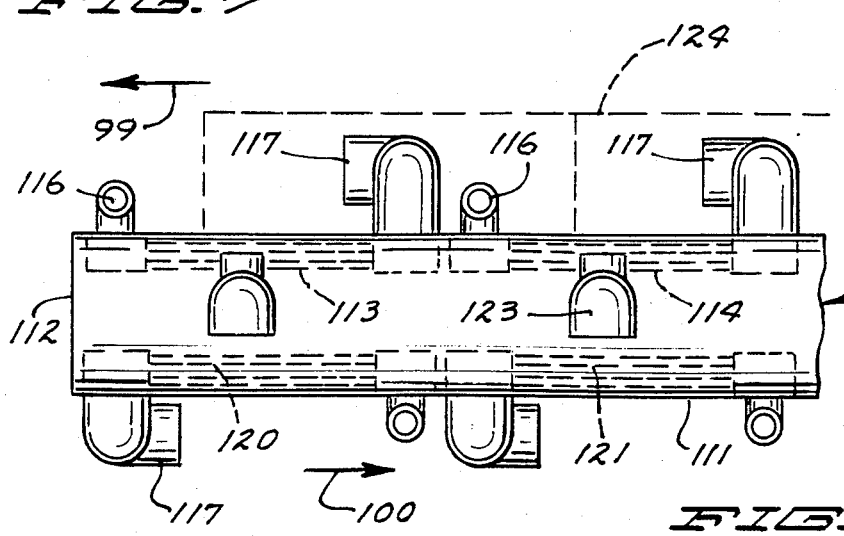

TIRE PYROLIZING

BACKGROUND OF THE INVENTION

Pyrolytic apparatus for decomposing tires into gas, oil and other by products such as steel, carbon black and fiberous material.

Prior to this invention there has been provided pyrolytic apparatus having a metal vessl defining a reactor chamber for having tires decomposed therein (no lining in the vessel), a metal housing surrounding only the cylindrical wall and one end wall of the vessel to in conjunction therewith define a hot gas plenum chamber, a burner unit exterior of the housing for supplying hot combustion gases to the plenum chamber to heat the surrounded vessel surfaces and thereby heat the vessel interior, an exhaust opening to the plenum chamber, a condenser unit exterior of the vessel and housing for receiving vaporized oil and recovered gases from the reactor chamber, part of the recovered gases passing through the condenser being returned to the reactor chamber and part through a compressor and thence to a recovery gas storage tank, and an oil storage tank for receiving condensed oil from the condenser unit. With such prior apparatus the vessel is subjected to substantial stressing due to the high temperatures that it is heated to for decomposing the tires and subsequent cooling. Further conventional pyrolytic reactors require that the pyrolysis gas be pumped to a condenser which involves the provision of a separate condenser, piping and pumps and the resulting costs. Also conventional pyrolytic reactors must be purged with an inert gas to evacuate oxygen prior to the application of heat since there is a very slim chance that with a certain combination of reactor heat exchanger temperature, reactor load and reactor oxygen level the initial amount of air (oxygen) and gases generated will form an explosive mixture to result in a reactor explosion. Purging with inert gas on every loading cycle is expensive.

SUMMARY OF THE INVENTION

Pyrolytic apparatus that includes an axially elongated vessel, a refractory lining within the vessel and spaced from the vessel walls to define a gas-oil separation chamber, the refractory lining interior wall portions defining a reactor chamber for receiving discarded rubber tires, a heat exchanger within the reactor chamber for heating the reactor chamber, a burner exterior of the vessel for supplying hot combustion gases to the heat exchanger and means for conducting recovered gases and oil from the gas-oil separation chamber to separate recovered gas and oil storage tanks.

One of the objects of this invention is to provide new and novel pyrolytic means for decomposing rubber tires and recovering the decomposition by-products. Another object of this invention is to provide new and novel means for pyrolytically decomposing rubber tires into by-products such as gas, oil and carbon black and condensing the pyrolytic oil. A further object of this invention is to provide new and novel means for pyrolytically decomposing tires wherein a vessel serves for mounting means defining a reactor chamber having a heat exchanger therein, for containing the gaseous by-products produced under pressure and condensing the vaporized oil produced during the decomposition process. A still further object of this invention is to provide new and novel pyrolytic means for decomposing rubber tires and the like that does not require purging with inert gas for every loading cycle in order to prevent damage from possible reactor explosions.

It is to be noted that in this application even though during the pyrolytic reaction pyrolytic oil is vaporized to be in a gaseous form, the term gas as used herein does not include such vaporized oil, but only other gases such as methane that are given off during the pyrolytic reaction.

BRIEF DESCRIPTION OF THE DRAWINGS

FIG. 4 is a fragmentary axial vertical cross sectional view showing the door in sealing relationship to the vessel shell, said view being generally taken along the line and in the direction of the arrows 4—4 of FIG. 1;

FIG. 5 is a fragmentary isometric view of the lower part of the pyrolytic unit with various portions broken away at different axial positions;

FIG. 6 is a transverse cross sectional view of the pop-off pressure relief valve and adjacent parts of the vessel with transverse and vertical intermediate portions not being shown, said view being generally taken along the line and in the direction of the arrows 6—6 of FIG. 7;

FIG. 7 is a fragmentary horizontal cross sectional view generally taken along the line and in the direction of the arrows 7—7 of FIG. 6;

FIG. 10 is a somewhat diagrammatic plan view of the of the second embodiment of the pyrolytic unit of this invention.

Figure 1:
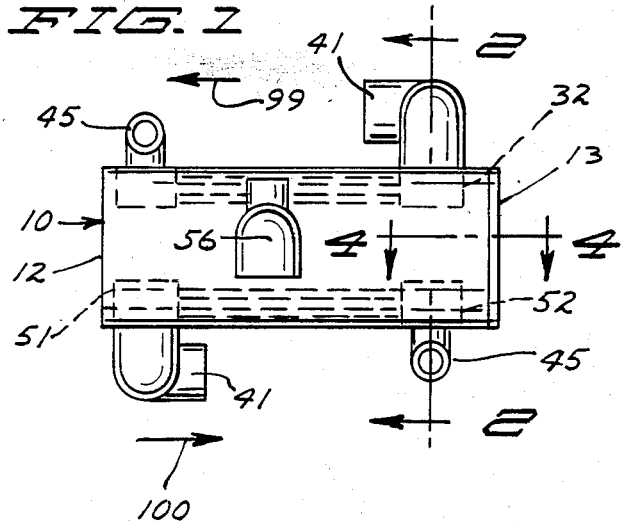
FIG. 1 is a somewhat diagrammatic plan view of the first embodiment of a pyrolytic unit of this invention.
Figure 3:
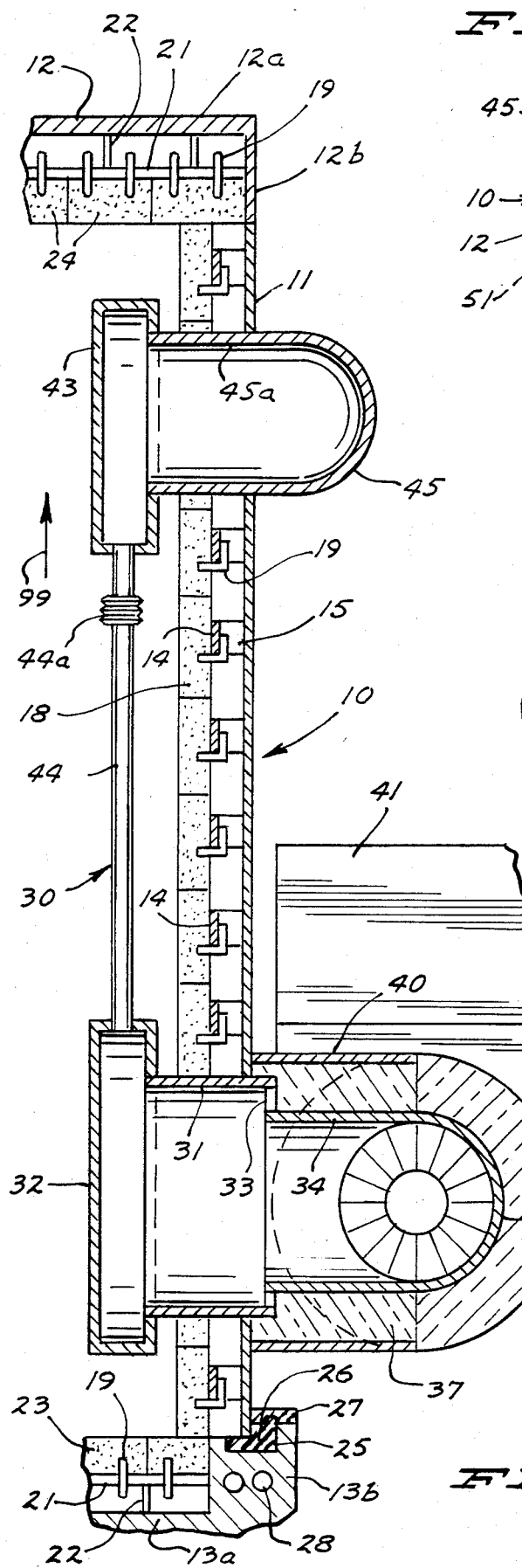
FIG. 3 is a fragmentary horizontal cross sectional view generally taken along the line and in the direction of the arrows 3—3 of FIG. 1.
Figure 8:
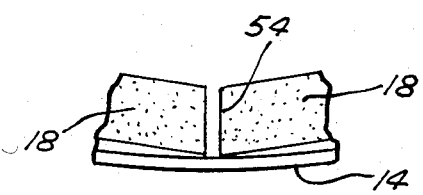
FIG. 8 is a fragmentary axial cross sectional view of one of the heat exchanger tubes showing its expansion joint and the baffle in the tube.
Figure 9:
FIG. 9 is a fragmentary cross sectional view of a pair of adjacent refractory blocks showing a crack between them that is of an exaggerated size that permits the passage of gas and/or oil from the reaction chamber to the separation chamber.
Figure 2:
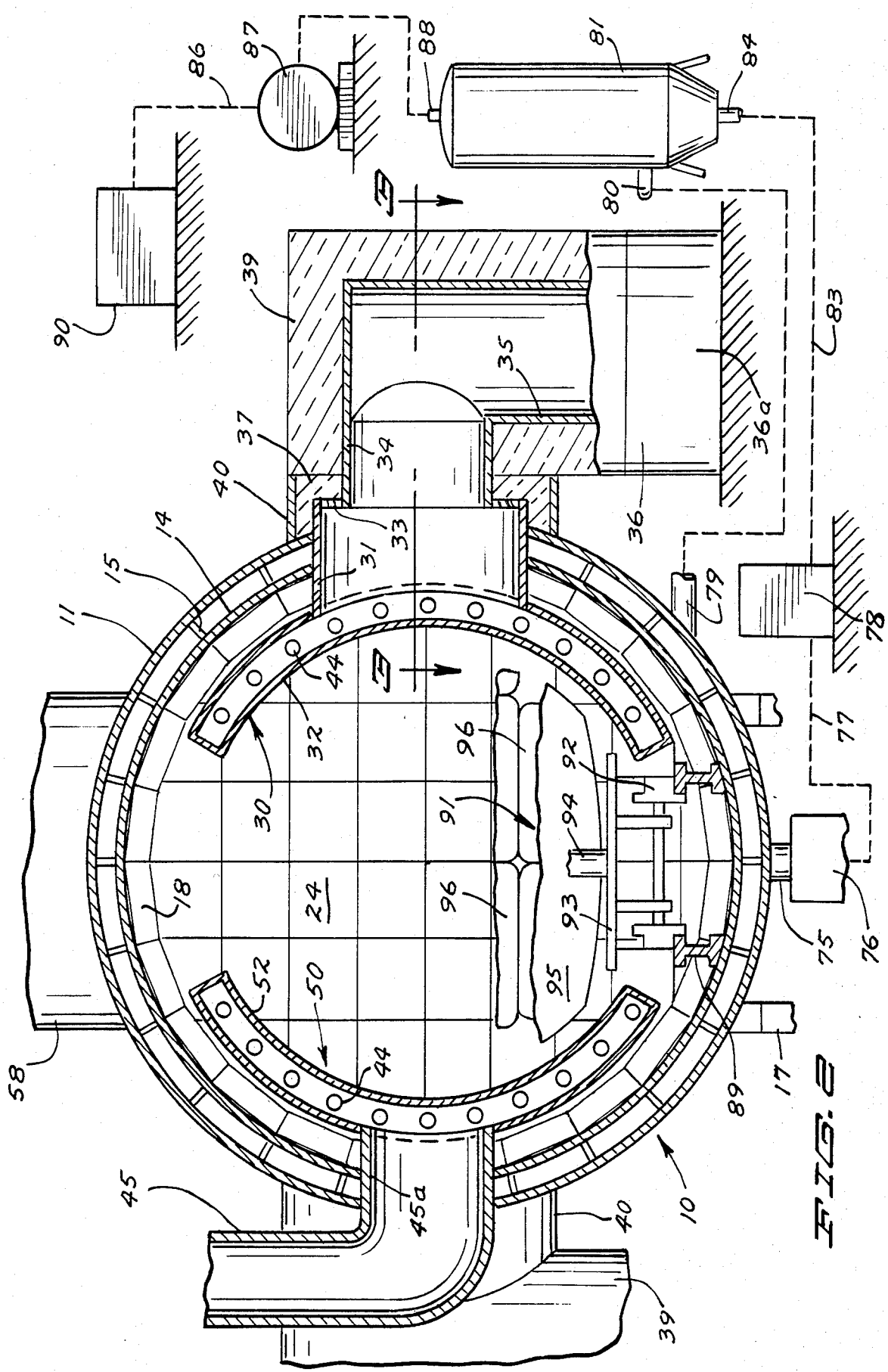
FIG. 2 is a transverse cross sectional view of the pyrolytic unit of FIG. 1 that is generally taken along the line and in the direction of the arrows 2—2 of FIG. 1 together with a diagrammatic showing of fluid flow paths to recovered gas and oil storage tanks.

Referring now in particular to FIGS. 1-3, the first embodiment of the pyrolytic unit of this invention, generally designated 10, includes a circular cylindrical auto clave shell 11 that is horizontally axially elongated, an end wall 12 joined to one end of the shell and a door 13 at the other end of the shell that defines a vessel. A suitable framework 17 is provided for mounting the vessel on the ground of a suitable foundation. The door may be mounted by hinges (not shown) or other suitable structure to permit it being opened and closed while suitable fastners (not shown) are provided for holding the door closed, even when the vessel is under positive pressure.

Within the shell there is provided a refractory lining that includes a plurality of axially spaced, circular annular bands 14, angularly spaced spacers (gussets) 15 being welded to the bands peripheral surfaces to extend radially outwardly thereof for maintaining the bands radially spaced from the shell and being welded to the shell. Each of the bands supports a circular row of refractory tile blocks 18 that have their radially outer surfaces adjacent the respective band. Each of the blocks has at least one anchor rod 19 that is bent to extend along the radial outer surface of the respective band for maintaining the block adjacent the band. It is to be noted some of the bands may not extend through 360° in order to provide for openings referred to hereinafter.

A plurality of vertically spaced, horizontally elongated bars 21 have the one ends of horizontally spaced vertical spacers 22 welded thereto, the opposite ends being welded to the inner surface of the vertical wall portion 13a of the door. The anchor rods 19 of refractory tile blocks 23 are hooked over the bars 21 for supporting the blocks axially spaced from the door wall 13a. The door includes an annular flange 13b joined to wall portion 13a that is of an inner diameter greater than the outer diameter of the axially adjacent circumferential row of blocks, of an outer diameter greater than the inner diameter of the shell and of an axial dimension greater than combined axial dimensions of the spacers 22, bars 21 and blocks 23. Flange 13b has an annular groove 25 that mounts a somewhat resilient seal member 26 that can withstand relatively high temperatures, for example 600° F., to be in sealing relationship with the adjacent annular edge of the shell when the door is closed to provide a sealed closed vessel. A retainer ring 27 may be mounted on the flange 13b to aid in retaining the seal member 26 in the groove. The door flange 13b has annular fluid passages 28 adjacent the groove 25 for having cooling fluid (for example air) passed therethrough to aid in preventing the temperature of the door flange adjacent the seal from becoming sufficiently high to destroy the seal. A suitable source and fluid lines (not shown) are provided for circulating cooling fluid through the passages 28.

Refractory tile blocks 24 are mounted on the end wall 12 by spacers 22 and bars 21 in a manner substantially the same as that described relative the blocks 23 being mounted on the door. It is to be noted that other than for the blocks 23, 24 that are most closely adjacent the annular flange 12b of the end wall 12 and flange 13b having one edges curved to extend closely adjacent the respective flange, advantageously the blocks are of a rectangular box shape. Further the blocks 23, 24 most closely adjacent flanges 12b, 13b extend further radially outwardly of the shell central axis than the blocks 18, while axially most remote circumferential rows of blocks 18 extend into abutting relationship with the adjacent blocks 23, 24 (assuming the door is closed). As a result blocks 18, 23, 24 form a substantially closed reactor chamber other than for openings to be referred to hereinafter and cracks 54 between the blocks. Even though not shown, it is to be noted that the blocks 24 may be sufficiently radially spaced from the end wall annular flange 12b to form an annular space that opens directly to the space axially between blocks 24 and the end wall portion 12a and the space radially between blocks 18 and the shell. Likewise blocks 23 may be radially spaced from the door flange 13b to provide an annular space that opens directly to the space axially between the blocks 23 and door portion 13a and the space radially between blocks 18 and the shell. Accordingly the blocks 18 define a generally circumferential lining portion while blocks 24 define a lining wall portion that substantially closes one open end of the generally cylindrical space encompassed by blocks 18 and blocks 23 define a second wall portion that substantially closes the axially opposite open end of said cylindrical space when the door is closed. It is believed to be apparent that flange 12b could be formed as part of the shell and that portion 12a would then constitute the end wall.

Within the reactor chamber there is provided a heat exchanger, generally designated 30, that includes an arcuate inlet manifold 32. The manifold is mounted by and has its inlet opening to a generally annular inlet member 31 which extends horizontally through appropriate openings in the refractroy lining and the shell and is mounted by the shell. A ring 33 is mounted by inlet member 31 and in turn mounts a reduced diameter tube 34. Tube 34 opens to a blower outlet 35 of the blower 36. Advantageously a housing 40 is provided to extend between the refractory insulation column 39 and the shell with high temperature insulating material 37 being in the space bounded by the shell, inlet member 31, ring 33, tube 34 and column 39. Column 39 sets on the blower housing 36a and surrounds the part of the blower inlet that extends above the housing. The blower is fluidly connected to a multi-purpose burner 41 to conduct the hot combustion gases therefrom and force said gases under pressure through members 35, 34, 33 and 31 into the manifold 32. The fuel for the burner may be gas, oil, waste (used) oil, or pyrolytic gas or oil, or other suitabel fuels.

The heat exchanger manifold 32 is located axially adjacent the door, the heat exchanger 30 including an outlet (exhaust) manifold 43 located within the reactor chamber on the same transverse side thereof as manifold 32, but at the axial opposite end of the shell. Manifold 43 is mounted by and has its outlet opening to the horizontal portion 45a of an exhaust gas stack 45 which extends through appropriate openings in the refractory lining and shell and is mounted by the shell. A plurality of axially elongated, vertically and arcuately spaced heat exchanger tubes 44 extend between the manifolds, open thereinto and are mounted thereby. Each tube includes a heat expansion joint 44a and a twisted baffle 47 to give a swirling action to the combustion gases as they pass therethrough. Advantageously the exhaust gases may be utilized in a heating system for a building or other purposes.

Located in the reactor chamber is a second heat exchanger, generally designated 50, that is of the same construction as that of exchanger 30 other than it is on the diametrically opposite side of the reactor chamber from exchanger 30, its inlet manifold 51 is axially adjacent end wall 12 and its outlet manifold 52 is adjacent the door whereby the gas flow through its heat exchanger tubes is in the opposite axial direction from that of the exchanger 30. As may be in part noted from FIG. 2 each of the manifolds extends through an arc of greater than 90° and is located at about the same elevation. Further the radial outer walls of the manifolds are located a slight distance radially inwardly of the part of the adjacent portion of the lining that is in part formed by blocks 18. Advantageously the radii of curvature of the manifold arcuate walls may emanate from the from the central axis of the vessel. The lower and upper ends of the respective set of manifolds 32, 52 and 45,51 are at about the same elevation and transversely spaced from one another with their intermediate portions being of a greater transverse spacing than their upper and lower end portions. Also, advantageously manifolds 32, 52 are about the same axial spacing from the door 13 while manifolds 45, 51 are about the same axial spacing from end wall 12.

A second burner 41 is fluidly connected to manifold 51 by the same structure described relative the first burner 41 being fluidly connected to manifold 32 whild manifold 51 is fluidly connected to and mounted by a second exhaust stack 45.

In order to prevent the pressure level from accidently building up in the vessel to an unsafe level, one or more "pop-off" (pressure relief) safety valves is provided. Although other safety valves could be used, the safety valve generally designated 56 includes a valve housing having an annular circular bottom wall 57 mounted to the insulated vessel outlet 58 to have the outlet extend above said wall. The outlet opens to a top portion of the gas-oil separation chamber, advantageously no blocks 18 being provided directly therebeneath. The valve housing also includes an annular lower circular wall portion 60 joined to the outer periphery of wall 57 to be eccentrically located relative the outlet 58. Welded to the outer periphery of wall portion 60 are a pair of plates 61. A pair of transversely elongated arms 63 have their intermediate portions pivotally connected at 62 to the upper ends of the plates.

The arms mount an outlet closure member 64 having a depending vertical annular flange concentric to wall portion 60, eccentric to outlet 58 and horizontally intermediate and spaced from wall portion 60 and the outlet 58. The closure member also included an insulated plug portion 64a for forming a sealing fit the outlet 58.

The valve housing includes an upper portion 66 having a closed top wall, a part 66a that is semicircular in horizontal cross section for one transverse part thereof and joined to wall portion 60 and a part 66b that is rectangular in horizontal cross section on the other transverse side thereof and opening to part 66a. A wall member 67, which has slots for the arms to pivot in, is joined to the lower edges of part 66b and the upper edge of the adjacent part of lower wall portion 60.

A ram 70 is pivotally connected to housing part 66b and pivotally connected to a framework 71 that is mounted by the end portions of arms 63 on the opposite side of pivot 62 from the plug 64a to resiliently retain the plug in a closed position. The ram retains the plug in a closed position until the pressure builds up above a preselected level and than permits the plug to pivot to an open condition. The inside diameters of the outlet(s) 58 are relatively large to permit quick pressure relief. A valve outlet 74 opens to the valve housing interior transversely opposite the ram.

Referring to FIGS. 2 and 5, one or more oil outlet lines 75 open to the interior of the lowermost part(s) of the shell 11 for condensed oil to drain therethrough and flow through an oil trap 76 and through a line 77 to an oil storage tank 78. A suitable pump (not shown) may be provided in line 77, if needed. Further one or more recovered gas outlet lines 79 open to the interior of the bottom portion of the shell at a sufficiently high elevation to be above the level of condensed oil that may be in the bottom part of the shell. The line(s) 79 are fluidly connected to the gas inlet port 80 of a conventional gas-oil separator 81. A line 83 (and pump if needed) is fluidly connected between the separator separated oil port 84 and the storage tank 78. A line 86 having a compressor 87 therein is fluidly connected between the separator outlet port 88 and the gas storage tank 90 to transfer recovered separated gas from the separator to the gas storage tank.

If the pyrolytic unit is relatively large, advantageously a pair of rails 89 may be mounted by the shell to extend the axial length of the reactor chamber to facilitate the movement of a suitable all metal vehicle into and out of the reactor chamber. Slots may be provided in the bottom of the rails to have the bands 14 extend through while the blocks 18 adjacent the rails are of a suitable shape to have the rails extend between circumferentially adjacent pairs of axial rows of blocks with a minimum necessary clearance space therebetween. Suitable rails and switching mechanism (not shown) is provided outside of the vessel to permit the door being opened and closed and when the door is opened to permit the vehicle moving over the rails outside to the rails inside of the reactor chamber.

Although not forming a part of this invention, in FIG. 2 there is shown a fragmentary portion of a vehicle, generally designated 91, having a framework 93 on which there is mounted rail engaging wheels 92. At either longitudinal end of the framework there is an upright 94, the upper ends of which (not shown) mount an open top container 95 for pivotal movement about a longitudinal axis for emptying the contents therein. The container is of a size for holding a relatively large number vehicle rubber tires 96, for example from trucks and automobiles.

In using the first embodiment of this invention the container 95 of the vehicle 91 or any other suitable open top metal container is loaded with tires and moved into the reactor chamber and the door is closed and fastened shut. Now with the burners and blowers operating the hot combustion gases from the burners are directed into the heat exchangers and therethrough to heat the reactor chamber. The gases entering the heat exchangers may be, for example, 2000°–2400° F. while the exit temperatures may be for example in the neighborhood of 1000° F. Advantageously the exhaust gases from stacks 45 are conducted to other equipment (not shown) to produce electricity, hot water, steam, warm air or otherwise utilized.

Since the combustion gases flowing through the tubes 44 of heat exchanger 30 flow in one axial direction (arrow 99) and through the tubes of the heat exchanger 50 in the opposite axial direction (arrow 100) the temperature throughout the axial length of the chamber is closer to being level than if only one heat exchanger were provided, or both had the heat exchanger inlets at the same axial end. After the door is closed no additional air or oxygen is provided in the reactor chamber, and the amount of oxygen that was initially in the chamber is insufficient to support combustion. As a result of the high temperature the tires decompose pyrolytically to give off pyrolytic gas and vaporized pyrolytic oil and leave carbon black, fiberous material and steel, if incorporated in the tires, and other non-liquid non gaseous material in the container. The container facilitates the removal of the solid by-products.

Due to the spacing of the refractory lining from the vessel walls and the heat exchangers being located within the refractory lining, the temperature of the vessel walls is much lower then the minimum temperature within the lining, for example is about 400°–500° F. The refractory lining thus provides an insulating barrier between the heat exchangers and the vessel. Since there are small cracks 54 between many adjacent pairs of refractory blocks, the pyrolytic gas and vaporized pyrolytic oil can and does pass through such cracks into the gas-oil separator chamber to be closely adjacent and/or contact the vessel walls. The vaporgas condenses on the vessel walls and flows to the bottom of the oil outlet(s) 75.

The pyrolytic gas in the gas-oil spearation chamber is drawn through line(s) 79 by operation of the condenser 87. Advantageously a sensor (not shown) is provided in the separation chamber to through appropriate control circuitry (not shown) to control the operation of the condenser to start and continue the withdrawal of the gas when the pressure in the chamber reaches a preselected level. The withdrawn gas is passed through the separator 81 to separate entrained oil from the pyrolytic gas.

After the start of a cycle of operation, the recovered pyrolytic gas and/or oil can be used as a fuel for the burners, only about 15-20% of the recovered gas and oil being needed to process the tires. The remainder together with the other recovered by-products can be sold for a profit. With this invention tires can be processed without first shredding, slitting or etc. Further since the process takes place without supplying oxygen there is no combustion and as a result the pyrolytic gas and oil can be recovered as a valuable source of energy. The energy equivalent of about one gallon of fuel oil can be recovered from each average size passenger car tire. Additionally since during the cycle of operation the system is closed with pyrolytic oil being transferred to a storage tank and the pyrolytic gas is compressed and transferred to a storage tank, there are no particles or gases from the reactor chamber that are discharged to the atmosphere. Accordingly the tires can be recycled and not discarded in a manner that would pollute the environment.

Referring to FIG. 10, the second embodiment of the invention, generally designated 110 is basically the same as the first embodiment other than for being axially longer and having a plurality of pairs of diametrically opposed heat exchanger units and accompanying structure for supplying heat and discharging combustion exhaust gases. The second embodiment includes a shell 111, an end wall 112, and a door (not shown) at the opposite end of the shell that forms a vessel, and a refractory lining (not shown) defining a reactor chamber extending the length of the vessel.

Within the reactor chamber on one side of the vessel there is provided a first heat exchanger 113 adjacent the end wall 112, a second heat exchanger 114 axially opposite of heat exchanger 113 from the wall 112 and depending on the length there may be provided additional heat exchangers between exchanger 114 and the door. For each of exchangers 113, 114 there is an exhaust stack 116 at the end thereof most closely adjacent end wall 112 and a burner and blower 117 for applying heat to the end thereof remote from wall 112. On the opposite side of the vessel there is provided a heat exchanger 120 adjacent the end wall 112, another heat exchanger 121 axially opposite of heat exchanger 120 from the end wall and, depending on the length of the vessel, there may be provided additional heat exchagers between exchanger 121 and the door. For each of the exchangers 120, 121 there is provided a burner and blower 117 at the end thereof adjacent end wall 112 and an exhaust stack 116 at the end of the respective exchanger that is remote from wall 112. Exchangers 113, 120 are diametrically opposite one another as are exchangers 114, 121. Likewise if additional pairs of exchangers are provided the two exchangers of each pair are diametrically opposite one another. The flow of combustion gases through the heat exchanger tubes at one side of the vessel (113, 114) is in the direction of arrows 99 while the flow through the tubes of the exchangers (120, 121) on the opposite side of the vessel is in the direction of the arrow 100. The heat exchangers, burners, blowers and stacks of the second embodiment are of the same construction as those of the first embodiment.

A plurality of axially spaced safety valves 123 are provided on the top portion of the shell, the safety valves advantageously being of the same construction as that described relative the first embodiment. Also a pyrolytic gas line 124 is fluidly connected to open to the lower portion of the shell interior at a plurality of axially space locations for transferring gas through a separator 81 to a condenser 87 and thence to a storage tank 90. Additionally a pyrolytic oil recovery line (not shown) is fluidly connected to open to the bottom of the shell interior at a plurality of axially spaced locations for transferring pyrolytic oil to an oil storage tank 78. Further rails (not shown) may be mounted in the reactor chamber to extend the length thereof such as indicated by rails 88 of the first embodiment. The operation of the second embodiment is the same as the first, the second embodiment having a larger capacity.

Either of the embodiments may have a door 13 at both axially ends thereof. Also if rails are provided, instead of having downwardly opening slots for the bands and condensed oil oil to pass through, axially spaced blocks (not shown) may be mounted by the shell for mounting the rails in spaced relationship to the shell along the axial length thereof.

In place of having separate pyrolytic oil and gas outlets on the shell, a combined gas and oil outlet(s) may be provided to open to the lowermost portion(s) of the shell to have both gas and condensed oil flow therethrough and the gas and oil separated by using conventional apparatus. Also during the time heat is being applied to the reactor chamber, the pressure in the may be maintained to be negative, substantially atmospheric, or above atmospheric.

As an example of the invention, but not as a limitation thereon, with reference to the first embodiment, the shell may have an inner diameter of about 85", the radial spacing of the bands from the shell may be about 2", the inner and outer radii of curvature of the manifolds may be about 31" and 37" respectfully with the manifolds extending through arcs of about 120°, the axial spacing of the axial remote ends of manifolds 32, 43 about 96" and the blocks 18 of thicknesses of about 3.5" and have radial inner surfaces of about 11"×11". The cracks 54 may be about $\frac{1}{8}$" to $\frac{1}{4}$". The inside diameter of the outlet 58 may be about 34".

With each of the embodiments of the invention the reactor vessel serves as both a gas tight container and a condenser. As a result a separate condenser does not have to be provided together with the accompanying piping and pumps such as required with prior art apparatus which have a condenser exterior of the reactor vessel. Thus with this invention there is obtained cost savings and increased efficiency.

Further with each of the embodiments the very large pop-off valve(s) are capable of releasing the pressure from a reactor explosion into the atmosphere without damage to the reactor unit of this invention in the event a reactor explosion occurs in the vessel. As a result costly purging with inert gas every loading cycle can be avoided, conventional pyrolytic reactors requiring such purging to prevent the small chance that with a certain combination of reactor heat exchanger temperature, reactor load and oxygen level, the initial amount of air (oxgen) and gases generated will form an explosive mixture and result in a reactor explosion that would damage such conventional pyrolytic reactor.

What is claimed:

1. A pyrolytic apparatus for pyrolytically decomposing tires and the like into pyrolytic gas and oil and other by-products, comprising a closed metal vessel having a door for access to the interior thereof, a refractory lining mounted in the vessel to define a gas-oil separation chamber between the vessel and the said lining the reactor chamber and having an inlet and an outlet, means exterior of the vessel and fluidly connected to the heat exchanger inlet for supplying heat to the heat exchanger, means fluidly connected to the heat exchanger outlet for conducting exhaust heat exterior of the vessel and means fluidly connected to the vessel for conducting the pyrolytic gas and oil from the gas-oil separation chamber to a location exterior of the vessel, said refractory lining having a passage means for the pyrolytic gas and oil to flow from the reactor chamber to the separation chamber.

2. The apparatus of claim 1 further characterized in that the vessel is axially elongated and that there is provided a second heat exchanger within the reactor chamber and having an inlet and an outlet, means exterior of the vessel and fluidly connected to the second heat exchanger inlet for supplying heat to the second heat exchanger and means fluidly connected to the second heat exchanger outlet for conducting exhaust heat exterior of the vessel, each of the heat exchangers including an inlet manifold, an exhaust manifold having the respective outlet and axially elongated heat exchanger tubes extending between the respective inlet and exhaust manifolds.

3. The apparatus of claim 2 further characterized in that the vessel has the door at one axial end thereof and an opposite axial end, the first heat exchanger inlet manifold and second heat exchanger exhaust manifold being axially adjacent the door and transversely spaced from one another, the second heat exchanger inlet manifold and first heat exchanger exhaust manifold being axially adjacent the vessels opposite end.

4. The apparatus of claim 1 further characterized in that the vessel is axially elongated, has the door at one axial end and includes an end wall at the opposite axial end and a peripheral shell extending axially between the door and the end wall, and that the refractory lining includes an axially elongated, generally annular first portion that is spaced inwardly from the shell to in part define at least part of the separation chamber and means for mounting said lining portion in the shell in the above mentioned spaced relationship, the annular first portion having passageways to permit fluid flow from the reactor chamber to the separation chamber.

5. The apparatus of claim 4 further characterized in that the refractory lining includes a second refractory portion axially spaced from the door to define part of the separation chamber, a third refractory portion axially spaced from the vessel opposite end to define a part of the separation chamber and means for mounting the second and third portions in the vessel in the above axially spaced relationship.

6. The apparatus of claim 5 further characterized in that said shell is axially elongated in a horizontal direction and is circular cylindrical and that the refractory lining first portion includes a plurality of refractory blocks, and that the means for mounting the first refractory portion includes a plurality of axially spaced, circumferential bands for mounting the blocks and angularly spaced gussets for each band to mount said bands in a radially spaced relationship with respect to the shell.

7. The apparatus of claim 6 further characterized in that the means for conducting pyrolytic gas and oil includes gas and oil outlets that open to the shell radially outwardly of the radially adjacent block.

8. The apparatus of claim 4 further characterized in that the above mentioned heat exchanger includes an inlet manifold axially adjacent the door and radially adjacent the refractory lining portion, an outlet manifold axially on the opposite side of the inlet manifold from the door and radially adjacent the annular first portion, and heat exchanger tubes extending between said manifolds, and that the means for supplying heat to the heat exchanger includes a burner blower combination exterior of the vessel for producing and discharging hot combustion gases, and conduit means for conducting the hot gases from said combination to the inlet manifold.

9. The apparatus of claim 8 further characterized in that there is provided a second heat exchanger in the reactor chamber that has an inlet and outlet, means at least in part located exterior of the vessel and fluidly connected to the second heat exchanger inlet for conducting hot combustion gases to the second heat exchanger inlet, and means fluidly connected to the second heat exchanger outlet for conducting gases exterior of the vessel, the second heat exchanger including a second outlet manifold axially adjacent the door, radially adjacent the annular first portion and diametrically opposite the first heat exchanger inlet manifold and an inlet manifold axially opposite the second outlet manifold from the door, radially adjacent the annular first portion and diametrically opposite the first heat exchanger outlet manifold.

10. The apparatus of claim 8 further characterized in that there is provided at least one pressure relief valve mounted on the gas oil separator chamber to prevent excessive pressure build up in the vessel.

11. The apparatus of claim 8 further characterized in that the means for conducting pyrolytic gas and oil from the separation chamber includes an oil outlet opening to the separation chamber adjacent the lowermost part of the vessel and a gas outlet opening to the lower portion of the separation chamber at a higher elevation than the oil outlet, and that there is provided means fluidly connected to the oil outlet for storing pyrolytic oil exterior of the vessel, a gas storage tank for the pyrolytic gas and a compressor fluidly connected between the gas outlet and gas storage tank for compressing and transferring pyrolytic gas from the separation chamber to the gas storage tank.

12. Tha apparatus of claim 8 further characterized in that a pair of rails are mounted within the vessel for supporting a wheeled vehicle, and that the refractory lining includes a second refractory portion, means for mounting the second refractory portion in axially spaced relationship to the vessel opposite end wall to in part define the separation chamber, a third refractory portion and means for mounting the third refractory portion in axially spaced relationship to the door to in part define a part of the separation chamber.

13. The apparatus of claim 9 further characterized in that an axially elongated third heat exchanger is mounted in the reactor chamber axially between the first heat exchanger and the vessel opposite end, a fourth heat exchanger mounted in the reactor chamber axially between the second heat exchanger and the vessel opposite end and diametrically opposite the third heat exchanger, and means exterior of the vessel and connected to the third and fourth heat exchangers for heating the heat exchangers.

14. The apparatus of claim 8 further characterized in that each of the manifolds is arcuately curved in cross section perpendicular to the axis of elongation of the shell and that the shell and refractory lining portion are generally circular in transverse cross section.

15. A prolytic apparatus for pyrolytically decomposing rubber vehicle tires and the like into by-products such as pyrolytic gas and oil and carbon black comprising a closed vessel having an interior and an access door opening to the interior, a heat exchanger within the vessel interior, means exterior of the vessel and connected to the heat exchanger for heating the heat exchanger to a sufficiently high temperature to pyrolytically decompose rubber vehicle tires into pyrolytic gas, vaporized pyrolytic oil and by-products, refractory means mounted in the vessel interior for defining a substantially closed reactor chamber having the heat exchanger therein and in conjunction with the vessel defining an oil gas separation chamber at least partially surrounding the reactor chamber and maintaining a sufficient temperature differential between the reactor chamber and the separation chamber that vaporized oil will condense in the separation chamber, said refractory means having means to permit the passage of pyrolytic gas and oil from the reactor chamber to the separation chamber to contact the vessel, said vessel having outlet means opening to the separation chamber for transferring pyrolytic gas and oil from the vessel interior to a location exterior of the vessel.

16. The apparatus of claim 15 further characterized in that the vessel includes an axially elongated, generally circular cylindrical shell, and that the refractory means includes a generally circular annular refractory portion radially inwardly of the shell and spaced therefrom.

17. The apparatus of claim 16 further characterized in that the heat exchanger includes an inlet manifold having an inlet, an outlet manifold spaced from the inlet manifold and having an outlet and a plurality of axially elongated heat exchanger tubes extending between the manifolds and that the means for heating the heat exchanger includes a burner blower combination exterior of the vessel and means for fluidly conducting combustion gases to the manifold inlet, and that a stack is fluidly connected to the manifold outlet and extending exterior of the vessel for conducting combustion gases away from the outlet manifold.

* * * * *

UNITED STATES PATENT AND TRADEMARK OFFICE
CERTIFICATE OF CORRECTION

PATENT NO. : 4,507,174
DATED : March 26, 1985
INVENTOR(S) : Wolfgang A. Kutrieb

It is certified that error appears in the above-identified patent and that said Letters Patent are hereby corrected as shown below:

Column 9, line 11, after "lining", insert --and enclosing a reactor chamber, a heat exchanger within--.

Signed and Sealed this

Sixth Day of August 1985

[SEAL]

Attest:

DONALD J. QUIGG

*Attesting Officer*  *Acting Commissioner of Patents and Trademarks*